United States Patent [19]

Shin

[11] 3,925,488

[45] Dec. 9, 1975

[54] PROCESS FOR THE PRODUCTION OF 1,3,5-TRIMETHY-2,4,6-TRIS(3,5-DI-TERT-ALKYL-4-HYDROXYBENZYL)BENZENE

[75] Inventor: Kju Hi Shin, Bloomfield Hills, Mich.

[73] Assignee: Ethyl Corporation, Richmond, Va.

[22] Filed: Mar. 1, 1974

[21] Appl. No.: 447,315

Related U.S. Application Data

[63] Continuation-in-part of Ser. No. 146,538, May 24, 1971, abandoned.

[52] U.S. Cl...... 260/619 B; 260/611 R; 260/619 A
[51] Int. Cl.$^2$......................................... C07C 37/00
[58] Field of Search ................... 260/619 R, 619 B

[56] References Cited
UNITED STATES PATENTS

| | | | |
|---|---|---|---|
| 3,026,264 | 3/1962 | Rocklin et al. | 260/619 B |
| 3,309,339 | 3/1967 | Barton et al. | 260/619 B |
| 3,644,538 | 2/1972 | Starnes | 260/619 B |
| 3,689,572 | 9/1972 | Ruppert et al. | 260/619 B |

Primary Examiner—Norman Morganstern
Attorney, Agent, or Firm—Donald L. Johnson; Robert A. Linn; Joseph D. Odenweller

[57] ABSTRACT

An improvement in the process of making 1,3,5-trimethyl-2,4,6-tris(3,5-di-tert-alkyl-4-hydroxybenzyl)benzene by reacting 3,5-di-tert-alkyl-4-hydroxybenzyl alcohol with mesitylene in the presence of an acid whereby an alkane or an aromatic sulfonic acid is used as the catalyst. The reaction is conducted in an inert solvent (b.p. 30°–100°C.) at boiling temperature such that water formed is codistilled from the reaction mixture together with the solvent. Yields are improved by adding formaldehyde to the reaction mixture. A preferred embodiment is the reaction of 3,5-di-tert-butyl-4-hydroxybenzyl alcohol with mesitylene in boiling dichloromethane solution using a p-toluene sulfonic acid catalyst. The products are antioxidants.

8 Claims, No Drawings

PROCESS FOR THE PRODUCTION OF 1,3,5-TRIMETHY-2,4,6-TRIS(3,5-DI-TERT-ALKYL-4-HYDROXYBENZYL)BENZENE

This application is a Continuation-in-Part of application Ser. No. 146,538, filed May 24, 1971, now abandoned.

BACKGROUND

Methods of making 1,3,5-trimethyl-2,4,6-tris(3,5-di-tert-alkyl-4-hydroxybenzyl) benzene are known. Rocklin et al, U.S. Pat. No. 3,026,264, described their preparation by the reaction of 3,5-dialkyl-4-hydroxybenzyl alcohols with mesitylene in an inert solvent using sulfuric acid or a Friedel-Crafts catalyst. The compounds formed are effective antioxidants. Related antioxidant use is described in U.S. Pat. No. 3,190,852; U.S. Pat. No. 3,296,188; and U.S. Pat. No. 3,342,637.

SUMMARY OF THE INVENTION

An object of this invention is to provide an improvement in the known process of making 1,3,5-trimethyl-2,4,6-tris(3,5-di-tert-alkyl-4-hydroxybenzyl) benzenes by reacting 3,5-di-tert-alkyl-4-hydroxybenzyl alcohols with mesitylene using a sulfuric acid or Friedel-Crafts catalyst. In the improved process an alkane or aromatic sulfonic acid is used as the catalyst and the reaction is conducted at the boiling point of a low boiling solvent, thus avoiding the dealkylation of tert-alkyl groups encountered when the reaction is conducted in higher boiling solvents such as tetrachloroethane. This permits use of far less catalyst than required when using sulfuric acid and also allows distillation of water from the reaction mixture which results in high yields and more product per reactor volume. Optionally, formaldehyde can be added to the reaction mixture to improve yields.

DESCRIPTION OF THE PREFERRED EMBODIMENTS

A preferred embodiment of the invention is an improvement in a process for making 1,3,5-trimethyl-2,4,6-tris(3,5-di-tert-alkyl-4-hydroxybenzyl) benzene comprising reacting 3,5-di-tert-alkyl-4-hydroxybenzyl alcohol with mesitylene in the presence of an acid whereby said acid is a catalytic amount of a sulfonic acid selected from the group consisting of lower alkane sulfonic acids, haloalkane sulfonic acids and benzene sulfonic acids.

The 3,5-di-tert-alkyl-4-hydroxybenzyl alcohols used in the process are compounds such as described in Morris et al, U.S. Pat. No. 3,030,428, and Rocklin et al, U.S. Pat. No. 3,026,264. In general, the alkyl groups contain from 4 to about 20 carbon atoms. Representative examples are:

3,5-di-tert-hexyl-4-hydroxybenzyl alcohol
3-methyl-5-tert-butyl-4-hydroxybenzyl alcohol
3,5-di-tert-dodecyl-4-hydroxybenzyl alcohol
3,5-di-tert-butyl-4-hydroxybenzyl alcohol
3,5-di-tert-octyl-4-hydroxybenzyl alcohol
3,5-di-tert-eicosyl-4-hydoxybenzyl alcohol and the like.

Preferred alkyl groups are tert-alkyl groups. The most preferred benzyl alcohol reactant is 3,5-di-tert-butyl-4-hydroxybenzyl alcohol.

The mole ratio of 3,5-di-tert-alkyl-4-hydroxybenzyl alcohol to mesitylene is not critical and good results are obtained using ratios from 2.5:1 to 4:1. A preferred ratio is from about 3.1:1 to 3.9:1.

The sulfonic acid catalysts are alkane sulfonic acids, haloalkane sulfonic acids or benzene sulfonic acids. Useful alkane sulfonic acids include the lower alkane sulfonic acids such as those in which the alkyl residue contains from 1 to about 4 carbon atoms. Examples of these are: methane sulfonic acid, methane disulfonic acid, ethane sulfonic acid, propane sulfonic acid, butane sulfonic acid, butane disulfonic acid, and the like. Of these, the most preferred is methane sulfonic acid.

Haloalkane sulfonic acids are the alkane sulfonic acids in which some of the hydrogen atoms on the alkyl portion are replaced with halogen, especially chlorine, bromine or fluorine. Examples are: fluoromethane sulfonic acid, difluoromethane sulfonic acid, trifluoromethane sulfonic acid, trichloroethane sulfonic acid, trichloromethane sulfonic acid, perchloroethane sulfonic acid, tribromomethane sulfonic acid, 3,3,3-tribromopropane sulfonic acid, tris(trifluoromethyl) methane sulfonic acid, and the like. Of these, the most preferred are the trihalomethane sulfonic acids, especially trifluoromethane sulfonic acid.

Benzene sulfonic acids are aromatic sulfonic acids in which a benzene ring is substituted with a sulfonic acid group. Some examples are: benzene sulfonic acid, p-toluene sulfonic acid, xylene sulfonic acid, naphthalene sulfonic acid, and the like. As can be seen from the above exemplification, the preferred group of aromatic sulfonic acids are the hydrocarbyl aromatic sulfonic acids, the most preferred being p-toluenesulfonic acid.

The preferred catalysts are benzene sulfonic acids.

An unusual feature of the present invention is that it permits the use of very small amounts of catalyst compared to the amount of sulfuric acid required to obtain comparable results. For instance, Example 1 in U.S. Pat. No. 3,026,264 reports about a 75 percent yield (57.8 grams) which required the use of over 1.6 moles of sulfuric acid per mole of 3,5-di-tert-butyl-4-hydroxybenzyl alcohol. Furthermore, the example required a very low reaction temperature, viz., 4°C. In sharp contrast, the present process can be carried out using a truly catalytic amount of sulfonic acid and, furthermore, can be carried out at temperatures that do not require refrigeration. For example, good results are obtained using as little as 0.005 mole of sulfonic acid per mole of 3,5-di-tert-alkyl-4-hydroxybenzyl alcohol. Of course, greater amounts can be used if desired. A useful range is from about 0.005 to 0.1 mole of sulfonic acid catalyst per mole of 3,5-di-tert-alkyl-4-hydroxybenzyl alcohol. A more preferred catalyst amount is from about 0.01 to 0.05 mole per mole of benzyl alcohol.

Another feature of the present invention is that it permits operation at higher temperatures than can be beneficially employed using sulfuric acid as the catalyst. Of course, lower temperatures can be used if desired but they are not required. A useful range is from about 10°–100°C. In a highly preferred embodiment the process is conducted in a substantially inert water-immiscible solvent. When this embodiment is followed it is especially preferred to conduct the process at the boiling point of the solvent. This serves a dual function. It controls the reaction temperature at the boiling point of the reaction mixture. For this reason, the substantially inert water-immiscible solvent should boil from about 30°–100°C. A more preferred range is about 30°–75°C. Lower boiling solvents can be used but they are difficult to handle and require refrigeration to condense and, for this reason, are not preferred.

A second function performed by the solvent is that, being water immiscible, it will co-distill at a low temperature with any water present in the system. The overall reaction results in the formation of water according to the following equation:

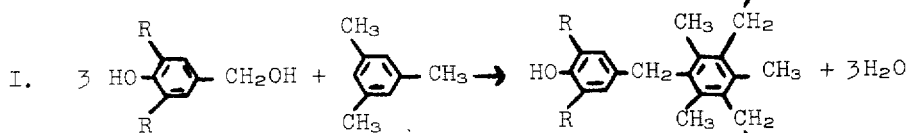

wherein R is tert-alkyl. It is believed that this water formation accounts for the large amount of acid required when using sulfuric acid to promote the reaction. The water hydrates the sulfuric acid. The water does not destroy the effectiveness of the catalyst used in the present improved process. Not only that, but the water will co-distill from the reaction mixture together with the water-immiscible solvent which serves to drive the reaction to completion. Water cannot readily be co-distilled when sulfuric acid is used as the catalyst because it is bound by the sulfuric acid. Also, at the reaction temperatures required to effect efficient co-distillation in the presence of sufficient sulfuric to efficiently promote the process a substantial amount of decomposition is obtained.

In a process which is the reverse of that of this invention, Martin et al, U.S. Pat. No. 3,062,895, described the reaction of 2,4-xylenol with 1,4-bis(hydroxymethyl)-tetramethylbenzene in tetrachloroethane (b.p. 146°C.) using p-toluene sulfonic acid catalyst. This reaction is quite distinct in that the hydroxymethyl group is not on the phenolic reactant but is on the benzene reactant, which is the reverse of the present reaction. Of even more importance is the fact that all of the alkyl substituents on either reactant are methyl groups, which the art recognizes to be very resistant to dealkylation. In contrast, tert-alkyl groups are known to be very susceptible to dealkylation in the presence of acids. If the present reactants are used in the Martin el al system substantial dealkylation is encountered. Thus, the Martin et al process never encountered the problem that the present invention solves by using a particular class of low boiling solvents. That is, it did not deal with a system subject to dealkylation.

In the co-distillation embodiment of the invention it is preferred to first condense the co-distillate. The co-distillate will separate into a water phase and a solvent phase. The water phase is removed and the solvent phase is recycled to the boiling reaction mixture in order to maintain a substantially constant amount of water-immiscible solvent in the reaction mixture.

Water-immiscible solvents that are useful include those that are substantially inert and have a normal boiling range from about 30° to about 100°C. An especially useful range is 30°–75°C. Higher boiling solvents can be used if the reaction is operated under sufficient vacuum to lower the boiling temperature of the mixture to the 30°–100°C. By "substantially inert" is meant that the solvents do not react to any extent with the other reactants used in the process under the reaction conditions. Preferred solvents are aliphatic hydrocarbons and chlorinated hydrocarbons. Examples of these are: pentane, hexane, isohexane, heptanes, 2,2,4-tri-methyl pentane ("isooctane"), and the like.

The preferred solvents are the chloroalkanes such as methylene chloride (dichloromethane), 1,1-dichloropropane, 1,2-dichloropropane, 2,2-dichloropropane, 1,1-dichloroethane, 1,2-dichloroethane, 1,1,1-trichloroethane, n-butyl chloride, sec-butyl chloride, isobutyl chloride, chloroform, carbon tetrachloride, and the like. The most preferred solvent is methylene chloride which boils at about 40°C.

The amount of solvent can vary within a wide range. All that is required is that a solvent amount be present. This will vary with the reactants and solvents used. In general, less of the chloroalkane solvents is required than hydrocarbon solvents since the chloroalkanes have higher solvent power. A useful solvent range is from about 50 to 500 parts per 100 parts of reactant. A preferred range is from 100 to 200 parts.

Although not desiring to be bound by any theories concerning reaction mechanism, it is believed that the process proceeds by initially forming a quinone methide which can react either with mesitylene to form the desired product or reversibly with 3,5-dialkyl-4-hydroxybenzyl alcohol to form 3,5-dialkyl-4-hydroxybenzyl ether. These reactions are shown by the following equations:

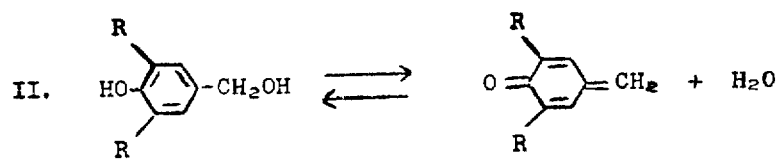

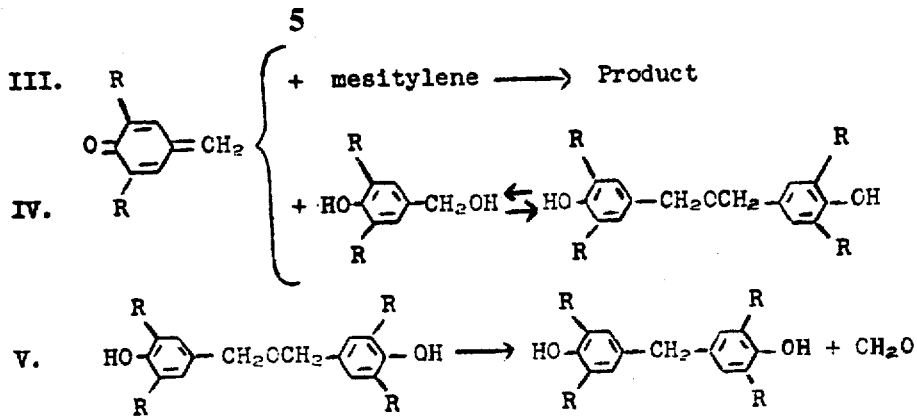

It is desirable to minimize the formation of the ether because this compound can decompose irreversibly according to Equation V, eliminating formaldehyde and forming 4,4'-methylenebis(2,6-dialkylphenol) as a by-product. In another embodiment of the present invention the formation of the bis-phenol by-product is minimized by adding the 3,5-di-tert-alkyl-4-hydroxybenzyl alcohol over an extended time period to a boiling reaction mixture containing mesitylene, sulfonic acid catalyst and water-immiscible solvent. The addition is at a controlled rate such that the mole ratio of unreacted 3,5-di-tert-alkyl-4-hydroxybenzyl alcohol to original mesitylene used in the reaction mixture at any one time remains below about 1:1. In other words, if the original reaction mixture contained one mole of mesitylene, the addition of 3,5-di-tert-alkyl-4-hydroxybenzyl alcohol should be at a controlled rate such that there is no more than one mole of unreacted 3,5-di-tert-alkyl-4-hydroxybenzyl alcohol present at any one time. Of course, minor excursions above this ratio for short periods of time, particularly towards the end of the reaction, are not damaging as long as the ratio is below 1:1 over the major part of the reaction.

The amount of unreacted 3,5-di-tert-alkyl-4-hydroxybenzyl alcohol in the reaction mixture can be monitored using a gas chromatograph, but it is much simpler to merely measure the amount of water co-distilled out since each mole of 3,5-di-tert-alkyl-4-hydroxybenzyl alcohol that reacts to form product will evolve a mole of water. Thus, if the initial reaction mixture contains 10 mole parts of mesitylene in addition to sulfonic acid catalyst and solvent and one adds one mole part of 3,5-di-tert-alkyl-4-hydroxybenzyl alcohol, the initial mole ratio is 1:10, well below the maximum. Then, as the reaction proceeds and water is co-distilled out, it can be replaced with an equal mole amount of 3,5-di-tert-alkyl-4-hydroxybenzyl alcohol. As the reaction proceeds and mesitylene is consumed, the actual ratio of benzyl alcohol to mesitylene will gradually increase. However, the mole ratio of unreacted 3,5-di-tert-alkyl-4-hydroxybenzyl alcohol to the original 10 moles of mesitylene added will remain at about 1:10 and the actual ratio of benzyl alcohol to mesitylene will remain sufficiently low over the major part of the reaction to significantly decrease the amount of bisphenol by-product.

After the reaction is complete the sulfonic acid catalyst is removed by known means. For example, methane sulfonic acid can be merely washed out. The product can then be recovered by such known means as crystallization. If the product is too soluble in the water-immiscible solvent then the reaction solvent can be distilled out and replaced with a different solvent having lower solvent action such as aliphatic hydrocarbons.

The following examples serve to illustrate the manner in which the process is carried out. All parts are by weight unless indicated otherwise.

EXAMPLE 1

In a reaction vessel was placed 91 parts of 3,5-di-tert-butyl-4-hydroxybenzyl alcohol, 13.2 parts of mesitylene, 1.06 parts of methane sulfonic acid, and 268 parts of methylene chloride. The mixture was stirred and heated to reflux (about 40°C.). Solvent and water co-distilled out and were condensed and separated. Water was removed and the solvent returned to the system. After 5 hours the reaction mixture was cooled to room temperature and 200 parts of n-heptane added. The solution was washed with water and then with dilute aqueous ammonia, and finally with water. The solution was then heated to 40°C. and most of the solvent distilled out under vacuum. The residue was recrystallized twice from n-heptane giving 43.2 parts of 1,3,5-trimethyl-2,4,6-tris(3,5-di-tert-butyl-4-hydroxybenzyl) benzene.

EXAMPLE 2

In a reaction vessel was placed 91 parts of 3,5-di-tert-butyl-4-hydroxybenzyl alcohol, 266 parts of dichloromethane, 13.2 parts of mesitylene and 2.1 parts of p-toluene sulfonic acid. The mixture was refluxed for 4.5 hours while removing water which co-distilled and recycling solvent. It was then cooled and 266 additional parts of dichloromethane added. This was washed twice with dilute aqueous ammonia and then with water. Solvent was evaporated out under vacuum and 150 parts of hexane added. This was heated to reflux and the solution cooled to ice temperature. The solid product which crystallized was filtered off and recrystallized from hexane, giving 43.3 grams of 1,3,5-trimethyl-2,4,6-tris(3,5-di-tert-butyl-4-hydroxybenzyl) benzene (m.p. 239.5°–240°C.), a 50.8 percent yield.

EXAMPLE 3

This example illustrates the process using both codistillation to remove water and controlled addition of the benzyl alcohol. A substantial yield increase results.

In a reaction vessel was placed 12 parts of mesitylene, 12.5 parts of methane sulfonic acid, and 161 parts of methylene chloride. The mixture was stirred and heated to boiling. Then, 10.06 parts of 3,5-di-tert-butyl-4-hydroxybenzyl alcohol were added and the mixture distilled, forming a two-phase distillate. The water phase was removed from the distillate and the methylene chloride phase recycled to the boiling reaction mixture. Over the next 4.5 hours, 7 additional 10.06 parts increments were added to the boiling reaction mixture each time the water removed overhead was about equal on a mole basis to the 3,5-di-tert-butyl-4-hydroxybenzyl alcohol added in the previous increment. A total of 80.48 parts of 3,5-di-tert-butyl-4-hydroxybenzyl alcohol was added during the reaction period. Water removed was about theoretical (5.51 parts). The mixture was then cooled and 200 parts of n-heptane added. It was then washed with water, followed by dilute aqueous ammonia, and finally again with water. Solvent was evaporated under vacuum and the residue recrystallized twice from 164 parts of n-heptane (m.p. 243°–243.5°C). Yield of 1,3,5-trimethyl-2,4,6-tris(3,5-di-tert-butyl-4-hydroxybenzyl) benzene was 55.2 parts (71.3 percent of theory).

EXAMPLE 4

In a reaction vessel place 123 parts of mesitylene, 12.5 parts of p-toluene sulfonic acid, and 1000 parts of 1,1,1-trichloroethane. Stir the mixture while heating to its boiling point (about 74°C.). Add an initial 102.3 parts of 3,5-di-tert-hexyl-4-hydroxybenzyl alcohol and then continue adding more at a controlled rate about equal on a mole basis to the amount of water that is removed from the system by co-distillation with the 1,1,1-trichloroethane solvent. Add a total of 1023 parts of the benzyl alcohol. Cool to room temperature and wash with water and dilute aqueous sodium bicarbonate. Distill out 800 parts of 1,1,1-trichloroethane under vacuum (liquid temperature 70°C.) and then add 500 parts of isooctane. Distill out an additional 500 parts of solvent mixture and then recrystallize the residue from isooctane, yielding 1,3,5-trimethyl-2,4,6-tris-(3,5-di-tert-hexyl-4-hydroxybenzyl) benzene.

It will be apparent that the procedure described in the above examples may be modified following the disclosure herein. For example, any of the different reactants, solvents and sulfonic acid catalysts may be substituted for their counterpart in each of the above examples. The trichloroethane solvent can be replaced with hexane, heptane, and the like. Likewise, the ratio of reactants may be varied within the ranges previously discussed.

Another embodiment of the invention includes a further improvement in the process whereby formaldehyde is added to the process reaction mixture prior to the completion of the reaction of 3,5-di-tert-alkyl-4-hydroxybenzyl alcohol with mesitylene. It has been found that this serves to inhibit the formation of the 4,4'-methylenebis(2,6-di-tert-alkylphenol) and thereby increases the yield of the desired product. The amount of formaldehyde added is not critical. A useful range is from about 0.05–0.5 moles per mole of 3,5-di-tert-alkyl-4-hydroxy-benzyl alcohol employed in the reaction. A more preferred range is from about 0.1–0.3 moles per mole of the benzyl alcohol. A preferred form of formaldehyde is as paraformaldehyde.

The formaldehyde may be added at the start of the process or during the process as long as the reaction is not already completed. The beneficial effect on yield is best achieved using a minimum amount of formaldehyde by adding the formaldehyde to the reaction mixture after about one-half of the 3,5-di-tert-alkyl-4-hydroxybenzyl alcohol has reacted with mesitylene. This can be determined by such means as monitoring the course of the reaction using gas chromatography.

In a highly preferred embodiment the addition of formaldehyde is combined with the gradual addition at a controlled rate of the 3,5-di-tert-alkyl-4-hydroxybenzyl alcohol to the boiling reaction mixture containing mesitylene, water-immiscible solvent and sulfonic acid catalyst. This results in very high yields. Also, in this manner, it is not necessary to use a gas chromatograph to monitor the reaction because the same results can be achieved by merely combining the addition of the formaldehyde with the addition of the last one-half of the 3,5-di-tert-alkyl-4-hydroxybenzyl alcohol. Preferably, the formaldehyde addition is also conducted at a controlled rate during the addition of the last one-half of the benzyl alcohol. A constant rate of addition of the formaldehyde during this period is not necessary and, in fact, good results can be obtained adding the entire quantity of formaldehyde at one time. However, the controlled addition rate embodiment wherein the addition of the formaldehyde is spread out during the entire addition of the last half of the benzyl alcohol gives improved results.

The following example serves to illustrate this embodiment of the invention.

EXAMPLE 5

In a reaction vessel is placed 120 parts of mesitylene, 755 parts of 3,5-di-tert-butyl-4-hydroxybenzyl alcohol, 8.8 parts of methane sulfonic acid and 2000 parts of isooctane. The mixture is stirred at about 50°C. and the course of the reaction followed by gas chromatograph. When about one-half of the benzyl alcohol has reacted, 12 parts of paraformaldehyde are added and the reaction continued until substantially all of the benzyl alcohol has reacted. It is then cooled, washed with water and with dilute ammonium hydroxide. About 1000 parts of isooctane are distilled out under vacuum and the remaining solution is then cooled, causing the product 1,3,5-tri-methyl-2,4,6-tris(3,5-di-tert-butyl-4-hydroxybenzyl) benzene to crystallize.

EXAMPLE 6

This example combines co-distillation to remove water controlled addition of the benzyl alcohol and the controlled addition of formaldehyde during the last one-half of the reaction.

In a reaction vessel was placed 160 parts of methylene chloride, 1.25 parts methane sulfonic acid, 12 parts mesitylene and 10.06 parts of 3,5-di-tert-butyl-4-hydroxybenzyl alcohol. While stirring, the mixture was heated to boiling causing methylene chloride and water to co-distill. Water was removed and the methylene chloride recycled to the boiling reaction mixture. As water was removed, more of the benzyl alcohol was added at a mole rate approximately equal to the rate that water was removed. After 40 parts of 3,5-di-tert-butyl-4-hydroxybenzyl alcohol had been added in this manner the gradual addition of paraformaldehyde was commenced at a rate such that a total of two parts was added during the addition of the last 40.48 parts (80.48 parts total) of the 3,5-di-tert-butyl-4-hydroxybenzyl alcohol. Total addition time was 6 hours. The mixture was cooled, washed with dilute aqueous ammonium hydroxide and again with water. Product was recovered by distilling out methylene chloride under vacuum and recrystallizing the residue twice from n-heptane. The yield of 1,3,5-tri-methyl-2,4,6-tris(3,5 -di-tert-butyl-4-hydroxybenzyl) benzene (m.p. 243.5°–244°C.) was 60 parts (77.5 percent of theory).

The compounds made by the present process are known antioxidants and their use is described in U.S. Pat. No. 3,026,264, incorporated herein by reference.

I claim:

1. In a process for making 1,3,5-tri-methyl-2,4,6-tris(3,5-di-tert-alkyl-4-hydroxybenzyl) benzene, said process comprising reacting 3,5-di-tert-alkyl-4-hydroxybenzyl alcohol with mesitylene in the presence of an acid catalyst, the improvement whereby dealkylation is reduced and increased yields are obtained, said improvement comprising (a) conducting said process in a substantially inert water-immiscible solvent having a normal boiling point of from about 30°–100°C, said process being carried out at the boiling point of the reaction mixture and distilling water formed during said process from said reaction mixture, (b) using as said acid catalyst a sulfonic acid selected from the group consisting of lower alkane sulfonic acids, halo-substituted lower alkane sulfonic acids and hydrocarbyl aromatic sulfonic acids, and (c) adding said 3,5-di-tert-alkyl-4-hydroxybenzyl alcohol over an extended time period to a boiling reaction mixture containing said mesitylene, said sulfonic acid catalyst and said inert solvent at a controlled rate such that the mole ratio of unreacted 3,5-di-tert-alkyl-4-hydroxybenzyl alcohol to original mesitylene in said boiling reaction mixture remains below about one mole of said 3,5-di-tert-alkyl-4-hydroxybenzyl alcohol per mole of original mesitylene.

2. The process of claim 1 wherein said 3,5-di-tert-alkyl-4-hydroxybenzyl alcohol is 3,5-di-tert-butyl-4-hydroxybenzyl alcohol.

3. The process of claim 2 wherein said sulfonic acid is p-toluene sulfonic acid.

4. The process of claim 3 wherein said inert solvent is dichloromethane.

5. The process of claim 3 further improved by adding from about 0.05 to about 0.5 moles, per mole of said 3,5-di-tert-butyl-4-hydroxybenzyl alcohol, of formaldehyde to the process reaction mixture prior to the completion of the reaction of said 3,5-di-tert-butyl-4-hydroxybenzyl alcohol with said mesitylene.

6. The process of claim 5 wherein from about 0.05 to about 0.5 moles, per mole of said 3,5-di-tert-butyl-4-hydroxybenzyl alcohol, of formaldehyde is added to said boiling reaction mixture after about one-half of said 3,5-di-tert-butyl-4-hydroxybenzyl alcohol has been added to said boiling reaction mixture at said controlled rate.

7. The process of claim 6 wherein said formaldehyde is in the form of paraformaldehyde.

8. The process of claim 7 wherein said inert solvent is dichloromethane.

* * * * *